US009037680B2

(12) United States Patent
Venkat et al.

(10) Patent No.: US 9,037,680 B2
(45) Date of Patent: *May 19, 2015

(54) APPLICATION ACCELERATION

(75) Inventors: Raghu Venkat, Palo Alto, CA (US); Manav Ratan Mital, San Carlos, CA (US); Hariharan Kolam, Palo Alto, CA (US); Sandeep Chauhan, Bengaluru (IN)

(73) Assignee: Instart Logic, Inc., Palo Alto, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 13/233,954

(22) Filed: Sep. 15, 2011

(65) Prior Publication Data
US 2013/0007221 A1    Jan. 3, 2013

Related U.S. Application Data

(60) Provisional application No. 61/502,742, filed on Jun. 29, 2011.

(51) Int. Cl.
*G06F 15/16* (2006.01)
*G06F 9/54* (2006.01)
*H04L 29/08* (2006.01)

(52) U.S. Cl.
CPC ........ *G06F 9/54* (2013.01); *H04L 67/06* (2013.01); *H04L 67/2823* (2013.01)

(58) Field of Classification Search
USPC .......................................... 709/219, 200, 231
See application file for complete search history.

(56) References Cited

U.S. PATENT DOCUMENTS

| 7,209,060 | B2 * | 4/2007 | Kumar et al. | 341/118 |
|---|---|---|---|---|
| 7,324,555 | B1 | 1/2008 | Chen et al. | |
| 7,695,370 | B2 | 4/2010 | Liu et al. | |
| 8,219,598 | B1 * | 7/2012 | Appleton et al. | 707/824 |
| 8,543,642 | B2 * | 9/2013 | Corbett et al. | 709/203 |
| 8,621,098 | B2 * | 12/2013 | Amento et al. | 709/231 |
| 8,626,919 | B1 * | 1/2014 | Papakipos et al. | 709/226 |
| 2001/0034736 | A1 | 10/2001 | Eylon et al. | |
| 2002/0010798 | A1 | 1/2002 | Ben-Shaul et al. | |
| 2002/0129123 | A1 | 9/2002 | Johnson et al. | |
| 2004/0044731 | A1 | 3/2004 | Chen et al. | |
| 2005/0010653 | A1 | 1/2005 | McCanne et al. | |
| 2006/0136389 | A1 * | 6/2006 | Cover et al. | 707/3 |
| 2007/0038773 | A1 * | 2/2007 | White et al. | 709/233 |
| 2007/0184902 | A1 * | 8/2007 | Liu et al. | 463/42 |
| 2008/0301135 | A1 | 12/2008 | Alves et al. | |
| 2009/0234947 | A1 | 9/2009 | Decasper et al. | |
| 2010/0095289 | A1 * | 4/2010 | Nguyen et al. | 717/169 |
| 2010/0153848 | A1 * | 6/2010 | Saha | 715/721 |
| 2010/0175058 | A1 * | 7/2010 | Radin et al. | 717/168 |
| 2011/0082982 | A1 | 4/2011 | Harvell et al. | |
| 2011/0145427 | A1 * | 6/2011 | Amento et al. | 709/231 |

(Continued)

*Primary Examiner* — Anthony Mejia
(74) *Attorney, Agent, or Firm* — Van Pelt, Yi & James LLP

(57) ABSTRACT

A method of transmitting content from a server to a client executing an application is disclosed. A request from a client for a file that includes content related to executing an application is received. The request is responded to by transmitting a modified file that includes initial portions of the file that are sufficient to permit initial functioning of the application, wherein the modified file is formatted with at least one placeholder for remaining portions of the file. The application can begin to access the initial portions of the file by accessing the modified file. The application can access the remaining portions of the file using the at least one placeholder.

27 Claims, 5 Drawing Sheets

(56) References Cited

U.S. PATENT DOCUMENTS

| | | | |
|---|---|---|---|
| 2011/0197126 A1* | 8/2011 | Arastafar | 715/243 |
| 2012/0016904 A1* | 1/2012 | Mahajan et al. | 707/769 |
| 2012/0110128 A1* | 5/2012 | Aaron et al. | 709/219 |
| 2012/0297030 A1* | 11/2012 | Knobel | 709/219 |
| 2012/0303697 A1* | 11/2012 | Alstad | 709/203 |
| 2013/0066877 A1* | 3/2013 | Raanan et al. | 707/741 |
| 2013/0091123 A1* | 4/2013 | Chen et al. | 707/722 |

\* cited by examiner

| Characters |
|---|
| Sheep.jpg |
| Strawberry.jpg |
| Cat.mpeg |
| . . . |

| Symbol Table |
|---|
| actionscripts |

| Timeline |
|---|
| new sheep()<br>new cat()<br>  .<br>  .<br>  .<br>screen.display(sheep, x, y) |

FIG. 2

APPLICATION ACCELERATION

CROSS REFERENCE TO OTHER APPLICATIONS

This application claims priority to U.S. Provisional Patent Application No. 61/502,742 entitled APPLICATION ACCELERATION filed Jun. 29, 2011 which is incorporated herein by reference for all purposes.

BACKGROUND OF THE INVENTION

Some computer applications require the downloading of resources through a client-server connection over a network before the applications can start. The long startup time may deter some end users from using the applications. Therefore, improved techniques for downloading the resources for these applications would be desirable.

BRIEF DESCRIPTION OF THE DRAWINGS

Various embodiments of the invention are disclosed in the following detailed description and the accompanying drawings.

FIG. 2 is a diagram illustrating an embodiment of a SWF file.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
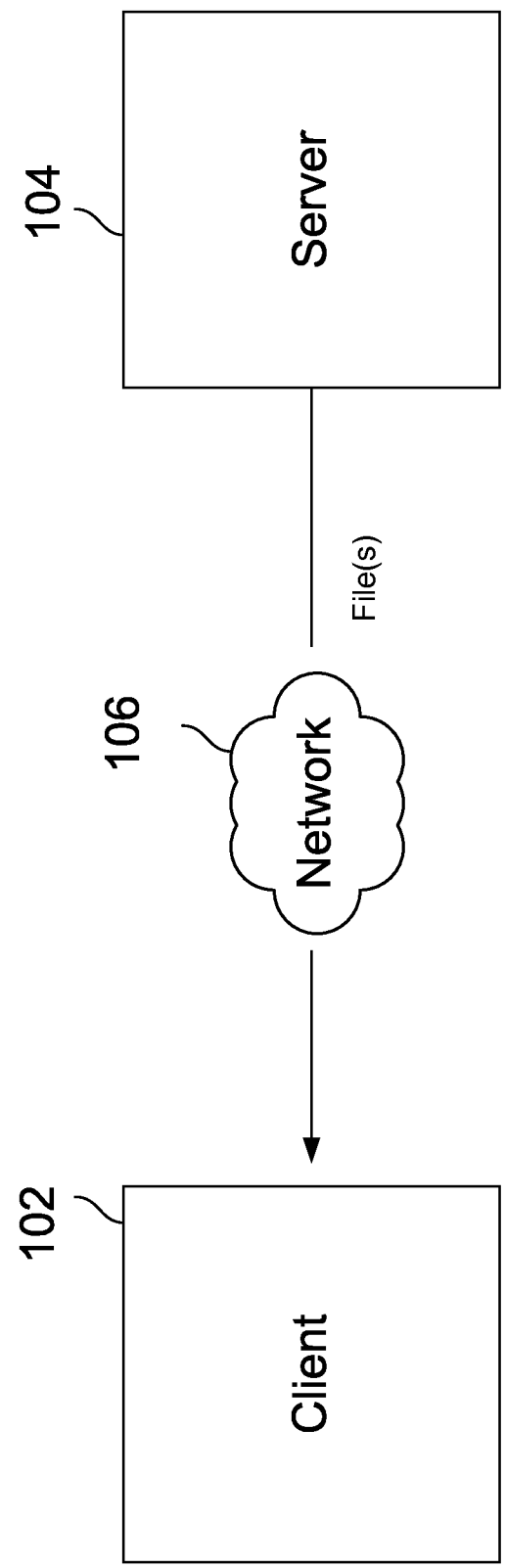
FIG. 1 is a block diagram illustrating an embodiment of a client-server connection through a network for downloading files for starting and loading an application on the client side.

FIG. 1 is a block diagram illustrating an embodiment of a client-server connection through a network for downloading files for starting and loading an application on the client side. As shown in FIG. 1, a client 102 is connected to a server 104 through a network 106. However, any number of clients and servers may be connected through network 106. Network 106 may be any combination of public or private networks, including intranets, LANs, WANs, and the Internet. Server 104 sends one or more files through network 106 to client 102. In some embodiments, the one or more files sent by server 104 to client 102 are files required by client 102 before a process can start to run.

In some embodiments, the process that requires the one or more files from server 104 is a game application. For example, the game application can be a browser game, i.e., a computer game played over the Internet using a web browser. Browser games include social network games, such as FarmVille, Mafia Wars, FrontierVille, and the like. These social network games are online games that are distributed through social networks, e.g., Facebook, and may feature multiplayer gameplay mechanics. The popular browser-based social network game, FarmVille, is used hereinafter as an example for the process or application described above. Farmville is selected for illustration purposes only; accordingly, the present application is not limited to this specific example only.

FarmVille is a farm simulation game available as an application on the social networking website Facebook. The game allows members of Facebook to manage a virtual farm by planting, growing, and harvesting virtual crops and trees, or raising livestock. Before the application can start to run on the client side, one or more SWF (Small Web Format) files are sent by server 104 to client 102 through network 106. These SWF files provide the application on the client side with resources it needs for starting and running the game. SWF can be used to present vector-based objects and images, audio, video, text, and other forms of interaction with the end user. After the one or more SWF files are received on the client side, the SWF files can be played by an Adobe Flash Player as a browser plugin. For example, text can be displayed, audio can be played, and movie clips can be played as the game begins.

FIG. 2 is a diagram illustrating an embodiment of a SWF file. A SWF file has different sections, including the character, symbol table, and timeline sections. The character section is used to store contents, such as images, movie clips, audio, and the like. For example, the character section of a SWF file sent by a FarmVille server may include image files (e.g., bitmap or jpeg files) and movie clips files (e.g., mpeg files) of various crops that may be planted in the farm, farm animals that can be raised in the farm, and the like. The timeline section has code to define how the animation of the game should progress over time. For example, the timeline may specify that a particular farm animal, e.g., a sheep, should be displayed at time t0 at a particular position on the screen. The symbol section includes code, e.g., actionscripts, for loading the image file (e.g., sheep.jpg or sheep.bmp) of the farm animal from the character section. The loaded image can then be displayed on the screen at the specified time and location. The symbol table section also includes character ID and class name information.

The number of SWF files for starting up FarmVille on the client side and the content of those SWF files are different for different player levels. As the player level increases, the number of SWF files for starting up FarmVille on the client side and the sizes of those SWF files may also increase. This is because some characters are only made available to players at or above a certain player level.

Although each player level has a different set of startup SWF files, players at the same player level receive an identical set of SWF files. The set of startup SWF files for a particular player level is updated periodically to incorporate new features or new characters for the game. Since the set of startup SWF files for a particular player level is not dynamically generated for a particular game player by the game publisher (i.e., Zynga), some game players may receive characters in the set of SWF files that are never used during their respective games. As the size (in bytes) of each image or movie clip file is typically large, receiving unnecessary characters embedded in the set of startup SWF files on the client side over a network translates to a long startup or loading time for the game, especially for higher player levels. In some cases, the long startup time can even deter some game players from playing the game. Therefore, a technique to speed up the startup time for a process or application on the client side, without compromising the game player's experience, would be desirable.

Figure 3:
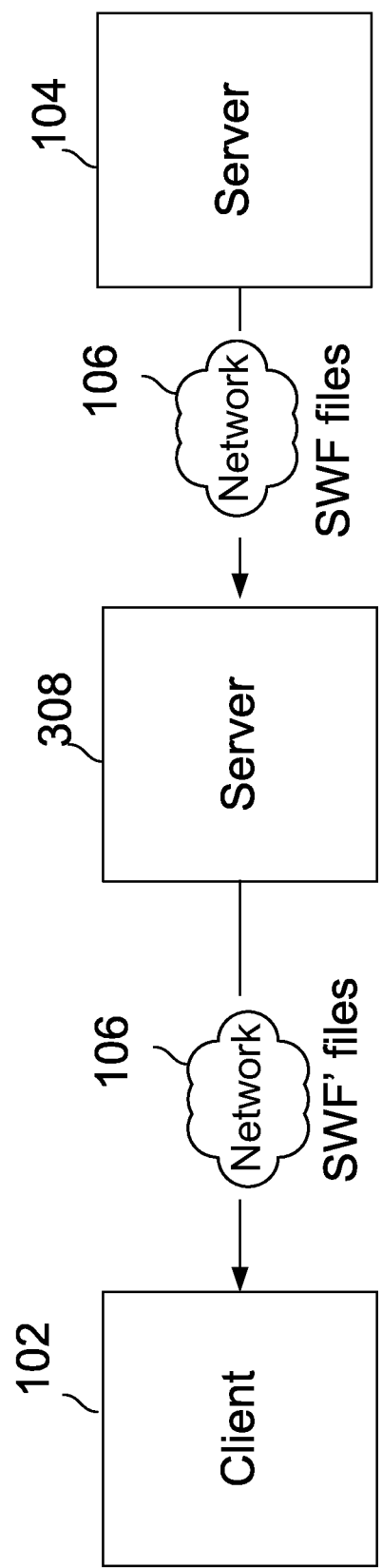
FIG. 3 is a diagram illustrating an embodiment of a client-server connection through a network for downloading files for starting and loading an application on the client side.

FIG. 3 is a diagram illustrating an embodiment of a client-server connection through a network for downloading files for starting and loading an application on the client side. Continuing with our FarmVille illustrative example above, the client no longer receives the startup files for running the FarmVille browser game directly from server 104 (as shown in FIG. 1) but from a server 308 other than server 104. In some embodiments, server 308 is a server that belongs to a content delivery network or content distribution network (CDN). Server 104 has access to the original startup SWF files provided by the game publisher of FarmVille (i.e., Zynga). These original startup SWF files are the SWF files that are normally downloaded by the user's browser when the game is started. Server 308 periodically obtains the most updated version of these original startup SWF files from server 104, modifies them, and then sends the modified startup SWF files (denoted SWF') for a particular player level to client 102 upon the client's request. For example, if server 104 provides three startup SWF files (SWF1, SWF2, and SWF3) for starting the game at a particular player level, then three modified startup SWF' files (SWF1', SWF2', and SWF3') are generated by server 308 and sent to client 102.

The modified startup SWF' files are smaller in size (measured in bytes) than the original startup SWF files, thereby reducing the downloading time of the files and thus the startup time of the application. The modified startup SWF' files contain portions of the original startup SWF files. These initial portions provide resources for the initial functioning of the application. For example, only a portion of the characters embedded in the original startup SWF files are required for the initial functioning of the application. The initial portions for each player level may be determined empirically. For example, the initial portions may be determined based on statistics collected by server 308 in a "profiling" process, which will be described in greater detail below.

In some embodiments, the game publisher may include code in the game application to be executed on the game player's machine (e.g., a laptop or smartphone) such that when the game is started, the browser will request (e.g., using HTTP requests) for startup files from server 308, instead of from server 104. However, other ways to redirect the file requests to server 308 may be used as well.

Figure 4:
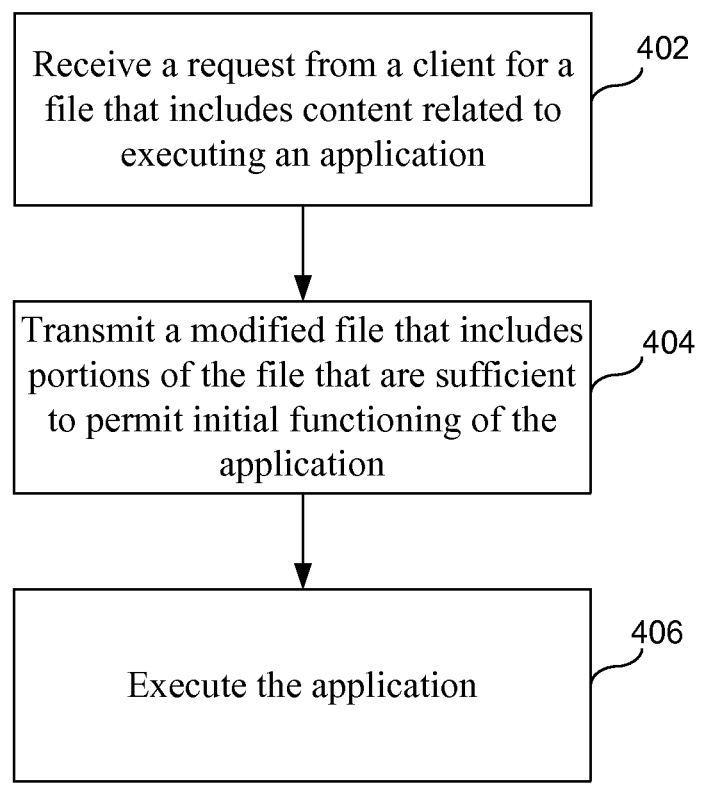
FIG. 4 is a diagram illustrating an embodiment of a process 400 for downloading a file from a server to a client, wherein the file is for starting and loading an application on the client side.

FIG. 4 is a diagram illustrating an embodiment of a process 400 for downloading a file from a server to a client, wherein the file is for starting and loading an application on the client side. At 402, a request for a file that includes content related to executing an application is received by a server from a client. For example, the request is a HTTP request for a startup SWF file containing content that is related to executing an application, such as a game application.

At 404, in response to the request, a modified file that includes initial portions of the original file that are sufficient to permit initial functioning of the application is transmitted from the server to the client. For example, the initial portions may include a subset of the characters embedded in an original startup SWF file provided by the game publisher. Continuing with the FarmVille illustrative example above, the initial portions may include the image or movie clip files of the most commonly planted crops or most commonly raised farm animals, background image files, the FarmVille logo, and the like. The remaining portions of the file are not included in the modified file. In the FarmVille example, the image or movie clip files of some of the less commonly planted crops or less commonly raised farm animals are not embedded in the character section of the modified startup SWF' file.

With continued reference to FIG. 4, after the modified file is received, the application can be executed at 406. Continuing with the FarmVille illustrative example above, a game player may begin to plant crops in the virtual farm, and so forth. For example, if the game player chooses to plant a particular crop and the image file for the crop is embedded in the character section of the modified startup SWF' file, then the application can begin to access the image file locally by accessing the modified startup SWF' file. If, however, the game player chooses to plant a particular crop and the image file for the crop is not embedded in the character section of the modified startup SWF' file, then the image file is accessed using a placeholder in the modified startup SWF' file.

In particular, the modified file is formatted with at least one placeholder for the remaining portions of the file. The at least one placeholder allows the application to access the remaining portions of the file. In some embodiments, the placeholder may be program code, data structures, interfaces, or a combination thereof, that allow the application to access the remaining portions of the file. As will be described in greater detail below, the remaining portions of the file may be fetched from one of the following: 1) the server through the network, or 2) a local cache, file system, or memory.

In some embodiments, the modified startup SWF' file includes program code, data structures, or interfaces from the original SWF file and also new code, data structures, or interfaces that are added by the server. In a SWF or SWF' file, a character is represented by a class. The class of a character is instantiated by calling the function "new ( )" before the character is used in the application. Because a particular character may not be actually embedded in the character section of the modified SWF' file, a new class for the character is created. The new class may import the same interfaces of the original class. Program code for loading the image includes program code from the original SWF file and also new code that are added by the server. For example, the original program code that uses the character will call into the new code such that before a character is loaded, the character is looked up in one of the following three locations: 1) the character section of the modified SWF' files, 2) the server through the network, and 3) a local cache, file system, or memory.

The first location is the character section of the modified SWF' files. In the FarmVille example, image or movie clip files of some of the most commonly planted crops or most commonly raised farm animals, background image files, the FarmVille logo, and the like, can be embedded in the character section of the modified startup SWF' file.

The second location is the server. In the FarmVille example, image or movie clip files of some of the less commonly planted crops or less commonly raised farm animals are not embedded in the character section of the modified startup SWF' file. Therefore, if a game player chooses a character that falls into this category, the client will not be able to access its content from the modified startup SWF' file. Instead, the client needs to explicitly request (e.g., using HTTP requests) the server to send the content for the character over the network. In this case, the game player enjoys a shorter startup time at the beginning of the game, but may experience some network latency at a later stage. After the content of the character is received, it is loaded by the application for immediate use. The content is also stored locally in the cache, in a file, or memory for later retrieval.

The third location is the local cache, file system, or memory. In the FarmVille example, sometimes the contents for some of the characters are already stored in the local cache, file system, or memory of the game player's machine (e.g., a laptop or smartphone) before a game is started. For example, if the game has been played on the machine before, contents for some of the characters that have been previously fetched from the server can be found in the local cache, file system, or memory.

Figure 5:
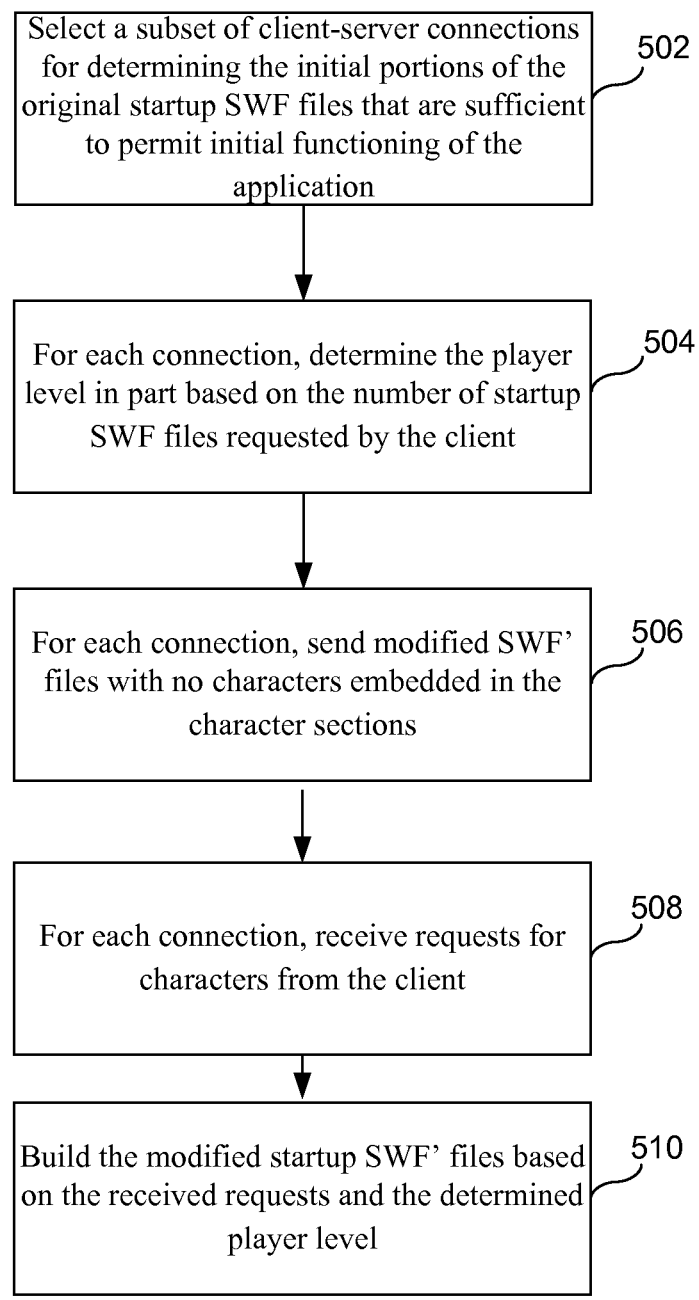
FIG. 5 is a diagram illustrating an embodiment of a profiling process 500 for determining the initial portions of original startup SWF files that are sufficient to permit the initial functioning of the application in process 400.

FIG. 5 is a diagram illustrating an embodiment of a profiling process 500 for determining the initial portions of original startup SWF files that are sufficient to permit initial functioning of the application in process 400. At 502, a subset of client-server connections are selected for determining the initial portions of the original startup SWF files that are sufficient to permit initial functioning of the application. In some embodiments, the subset of client-server connections is in part selected based on the connection speed of those connections. For example, high-speed connections may be preferred in some embodiments. In some embodiments, the profiling process 500 is performed during a trial period, and the subset of client-server connections corresponds to the connections made during the trial period.

At 504, for each connection, the player level is determined in part based on the number of startup SWF files requested by the client. Using the FarmVille example, the number of SWF files for starting up the game on the client side and the content of those SWF files are different for different player levels. Therefore, based on the number of startup SWF files requested, the server may determine the player level.

At 506, for each connection, modified SWF' files are sent with no characters embedded in the character sections of the modified SWF' files. Since the modified SWF' files do not have any characters embedded in the character sections of the files, the client needs to request for the characters that the application needs explicitly.

At 508, for each connection, requests for characters from the client are received. For example, if the game player chooses to plant a particular crop and the image file for the crop is not embedded in the character sections of the modified startup SWF' files, then the image file is accessed using a placeholder in one of the modified startup SWF' files. Assuming that the image file is not found locally, a request for the image file is sent through the network to the server.

At 510, modified startup SWF' files are built based on the received requests and the determined player level. For example, if a particular crop is requested by 70% or more of the connections at player level #2, then the content corresponding to the crop is included in the character section of one of the modified startup SWF' files for player level #2; otherwise, the content corresponding to that crop is not included. In this way, modified SWF' files for different player levels can be built based on the collected statistics.

In some embodiments, after the modified startup SWF' files are downloaded and the application is up and running, additional resources can be pushed from server 308 to client 102. These additional resources are pushed to the client even if the client has not specifically requested for them. In some embodiments, the profiling process 500 may be used to determine the resources that are pushed and the order in which the resources are pushed. For example, characters that are frequently requested by game players at a particular player level but are not included in the modified start SWF' files can be pushed to the client using this method. For example, characters that are frequently requested at an earlier stage of the player level are pushed earlier. Pushing resources to the client trades increased bandwidth requirements for reduced network latency. Therefore, the determination of whether to push resources to the client this way or what kind of resources to push can be based on different factors. For example, the determination can be based on the preferences of the game developer and/or the game player, the speed of the connection, and the machine (e.g., a smartphone or laptop) on which the application is run.

In some embodiments, server 308 has a local cache for storing the different characters. Compared to other techniques in which the entire SWF file is cached, server 308 caches the characters. In other words, the content granularity of the CDN is a character. If a character changes, only the character needs to be distributed, as opposed to the entire SWF file. In some embodiments, the quality of the characters can be adapted based on the network bandwidth. For example, when the available bandwidth is limited, the image file of a character sent in a modified startup SWF' file can be a compressed image file.

Distributing content dynamically as described above reduces the quantity and the volume of the content that is distributed to the end-users. As a result, the downloading time and startup time are reduced. Because of the reduced network activities, the battery consumption of the user devices (e.g., phones and tablets) are also reduced. In some embodiments, the client is installed in the firmware of the user devices, thereby providing faster and improved responses.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of transmitting content from a server to a client executing an application, comprising
receiving a request from a client for a file that includes content related to executing an application, wherein the file is generated by a publisher of the application;
responding to the request by transmitting a modified file that includes initial portions of the file that are sufficient to permit initial functioning of the application, wherein the modified file is formatted with at least one placeholder for remaining portions of the file, wherein the modified file is generated by the server based on the file generated by the publisher of the application, and wherein the initial portions of the file comprise likely to be used portions of the file, and wherein the likely to be used portions of the file are determined empirically by the server in a profiling process; and wherein the application can begin to access the initial portions of the file by accessing the modified file, and wherein the application can access the remaining portions of the file by accessing the at least one placeholder.

2. The method of claim 1, wherein the initial portions of the file are based on a state of the application.

3. The method of claim 2, wherein the application is a game application, and wherein the state of the application is a player level.

4. The method of claim 1, wherein the profiling process comprises analyzing behavior of other clients executing the application and connected to the server.

5. The method of claim 1, wherein the file is a Small Web Format (SWF) file.

6. The method of claim 1, wherein the file includes a script, and wherein the modified file includes a modified script.

7. The method of claim 1, wherein the file includes a first class, and wherein the modified file includes a second class that imports the first class.

8. The method of claim 1, wherein the request is a HTTP request.

9. The method of claim 1, wherein accessing any of the remaining portions of the file by accessing the at least one placeholder comprises accessing the portion from one of the following: a cache, a file system, or a memory.

10. The method of claim 1, wherein accessing any of the remaining portions of the file by accessing the at least one placeholder comprises requesting the portion from the server.

11. The method of claim 1, further comprising transmitting a subset of the remaining portions of the file to the client prior to the client requesting the subset from the server.

12. The method of claim 11, wherein the subset is in part based on how likely the subset is used by the application.

13. The method of claim 1, wherein the server includes a cache with a content granularity smaller than the file.

14. A system for transmitting content from a server to a client executing an application, comprising:
a processor configured to:
receive a request from a client for a file that includes content related to executing an application, wherein the file is generated by a publisher of the application;
respond to the request by transmitting a modified file that includes initial portions of the file that are sufficient to permit initial functioning of the application, wherein the modified file is formatted with at least one placeholder for remaining portions of the file, wherein the modified file is generated by the server based on the file generated by the publisher of the application, and wherein the initial portions of the file comprise likely to be used portions of the file, and wherein the likely to be used portions of the file are determined empirically by the server in a profiling process; and
wherein the application can begin to access the initial portions of the file by accessing the modified file, and wherein the application can access the remaining portions of the file by accessing the at least one placeholder; and
a memory coupled to the processor and configured to provide the processor with instructions.

15. The system of claim 14, wherein the initial portions of the file are based on a state of the application.

16. The system of claim 15, wherein the application is a game application, and wherein the state of the application is a player level.

17. The system of claim 14, wherein the profiling process comprises analyzing behavior of other clients executing the application and connected to the server.

18. The system of claim 14, wherein the file is a Small Web Format (SWF) file.

19. The system of claim 14, wherein the file includes a script, and wherein the modified file includes a modified script.

20. The system of claim 14, wherein the file includes a first class, and wherein the modified file includes a second class that imports the first class.

21. The system of claim 14, wherein the request is a HTTP request.

22. The system of claim 14, wherein accessing any of the remaining portions of the file by accessing the at least one placeholder comprises accessing the portion from one of the following: a cache, a file system, or a memory.

23. The system of claim 14, wherein accessing any of the remaining portions of the file by accessing the at least one placeholder comprises requesting the portion from the server.

24. The system of claim 14, wherein the memory is further configured to provide the processor with instructions which when executed cause the processor to transmit a subset of the remaining portions of the file to the client prior to the client requesting the subset from the server.

25. The system of claim 24, wherein the subset is in part based on how likely the subset is used by the application.

26. The system of claim 14, wherein the server includes a cache with a content granularity smaller than the file.

27. A computer program product, the computer program product being embodied in a non-transitory computer readable storage medium and comprising computer instructions executed by a processor for:
receiving a request from a client for a file that includes content related to executing an application, wherein the file is generated by a publisher of the application;
responding to the request by transmitting a modified file that includes initial portions of the file that are sufficient to permit initial functioning of the application, wherein the modified file is formatted with at least one placeholder for remaining portions of the file, wherein the modified file is generated by the server based on the file generated by the publisher of the application, and wherein the initial portions of the file comprise likely to be used portions of the file, and wherein the likely to be used portions of the file are determined empirically by the server in a profiling process; and
wherein the application can begin to access the initial portions of the file by accessing the modified file, and wherein the application can access the remaining portions of the file by accessing the at least one placeholder.

* * * * *